United States Patent
Ko

(10) Patent No.: US 9,430,225 B2
(45) Date of Patent: Aug. 30, 2016

(54) SOFTWARE UPDATE SERVICE METHOD AND APPARATUS FOR MOBILE TERMINAL

(71) Applicant: Samsung Electronics Co., Ltd., Gyeonggi-do (KR)

(72) Inventor: Yun-Jeong Ko, Chungcheongnam-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 43 days.

(21) Appl. No.: 14/069,545

(22) Filed: Nov. 1, 2013

(65) Prior Publication Data

US 2014/0173588 A1 Jun. 19, 2014

(30) Foreign Application Priority Data

Dec. 14, 2012 (KR) .................. 10-2012-0146250

(51) Int. Cl.
G06F 9/44 (2006.01)

(52) U.S. Cl.
CPC ..................... G06F 8/68 (2013.01)

(58) Field of Classification Search
CPC .............. G06F 8/60–8/68; G06F 8/70–8/71
USPC ................................... 717/168–178
See application file for complete search history.

(56) References Cited

U.S. PATENT DOCUMENTS

| | | | |
|---|---|---|---|
| 7,263,531 B2* | 8/2007 | Venkatesan | G06F 8/68 |
| 7,529,779 B2* | 5/2009 | Herle | G06F 8/68 |
| 7,574,706 B2 | 8/2009 | Meulemans et al. | |
| 7,673,300 B2* | 3/2010 | Herle | G06F 8/68 717/169 |
| 7,681,190 B2* | 3/2010 | Venkatesan | G06F 8/68 717/132 |
| 7,685,590 B2* | 3/2010 | Venkatesan | G06F 8/68 717/132 |
| 7,881,745 B1* | 2/2011 | Rao | G06F 8/65 455/414.1 |
| 8,307,095 B2* | 11/2012 | Clark | G06F 8/65 709/219 |
| 8,468,515 B2* | 6/2013 | Chen et al. | 717/170 |
| 8,555,273 B1* | 10/2013 | Chia et al. | 717/173 |
| 8,825,991 B2* | 9/2014 | Kim | G06F 8/665 709/220 |

(Continued)

FOREIGN PATENT DOCUMENTS

KR 10-2011-0104383 A 9/2011

OTHER PUBLICATIONS

Security Enhanced Firmware Update Procedures in Embedded Systems—David Abrahamsson—Institutionen för datavetenskap, Department of Computer and Information Science—Linköping, Sweden; Jun. 10, 2008.*

(Continued)

Primary Examiner — Francisco Aponte
(74) Attorney, Agent, or Firm — Cha & Reiter, LLC.

(57) ABSTRACT

A software update method and apparatus for a mobile terminal is provided. A delta generating server determines a plurality of available update versions for a currently installed version of a target software of the mobile terminal and transmits available update version information indicating available update versions to the mobile terminal. The mobile terminal receives the available update version information from the delta generating server and displays the available update version information. When one of the update versions is selected, a delta file for updating the target software to the selected version is generated by the delta generating server and is downloaded to the mobile terminal.

10 Claims, 4 Drawing Sheets

(56) References Cited

U.S. PATENT DOCUMENTS

| | | | |
|---|---|---|---|
| 8,914,473 B2* | 12/2014 | Clark | G06F 8/65 709/219 |
| 2003/0115311 A1* | 6/2003 | Johnston-Watt et al. | 709/223 |
| 2004/0088473 A1* | 5/2004 | Ogle | 711/100 |
| 2005/0278399 A1* | 12/2005 | Herle | G06F 8/68 708/100 |
| 2005/0278715 A1* | 12/2005 | Herle | G06F 8/68 717/162 |
| 2007/0150524 A1* | 6/2007 | Eker et al. | 707/203 |
| 2007/0169090 A1 | 7/2007 | Kang | |
| 2007/0169093 A1* | 7/2007 | Logan et al. | 717/168 |
| 2007/0294686 A1* | 12/2007 | Oh | 717/168 |
| 2008/0059958 A1* | 3/2008 | Bolanowski | 717/168 |
| 2008/0098160 A1* | 4/2008 | Slyz et al. | 711/103 |
| 2008/0216066 A1* | 9/2008 | Oh | 717/173 |
| 2009/0070374 A1* | 3/2009 | Eker | G06F 8/68 |
| 2009/0217256 A1* | 8/2009 | Kim | G06F 11/1433 717/168 |
| 2010/0175062 A1* | 7/2010 | Kim | 717/173 |
| 2010/0325622 A1* | 12/2010 | Morton | 717/168 |
| 2011/0200052 A1* | 8/2011 | Mungo et al. | 370/401 |
| 2011/0231834 A1* | 9/2011 | Kim | 717/173 |
| 2011/0265075 A1* | 10/2011 | Lee | 717/171 |
| 2012/0102477 A1* | 4/2012 | Kim et al. | 717/169 |
| 2012/0144279 A1* | 6/2012 | Rabeler | 714/807 |
| 2012/0254599 A1* | 10/2012 | Kim et al. | 713/1 |
| 2014/0366012 A1* | 12/2014 | Jamadagni | H04W 8/245 717/171 |

OTHER PUBLICATIONS

Secure Firmware Updates over the Air in Intelligent Vehicles—Dennis K. Nilsson and Ulf E. Larson Department of Computer Science and Engineering, Chalmers University of Technology SE-412 96 Gothenburg, Sweden—2008 IEEE.*

A Framework for Self-Verification of Firmware Updates over the Air in Vehicle ECUs—Dennis K. Nilsson Department of Computer Science and Engineering, Chalmers University of Technology, Gothenburg, Sweden—Lei Sun, Tatsuo Nakajima,Department of Computer Science and Engineering,Waseda University,Okubo Shinjuku Tokyo, Japan, 2008 IEEE.*

* cited by examiner

SOFTWARE UPDATE SERVICE METHOD AND APPARATUS FOR MOBILE TERMINAL

CLAIM OF PRIORITY

This application claims the priority under 35 U.S.C. §119(a) to Korean Application Serial No. 10-2012-0146250, which was filed in the Korean Intellectual Property Office on Dec. 14, 2012, the entire content of which is hereby incorporated by reference.

BACKGROUND

1. Technical Field

The present disclosure relates generally to a method and apparatus for updating software of a mobile terminal.

2. Description of the Related Art

As mobile terminals have evolved to provide complex and various functions, there has been a desire for upgrading mobile terminal software to correct firmware errors, add new functions, improve the user interface, and the like.

To update firmware of a mobile terminal, a technology known as Firmware Over-The-Air (FOTA) is used. The protocol for FOTA is a Firmware Update Management Object (FUMO) which is standardized by the Open Mobile Alliance Device Management (OMA-DM). FOTA uses a scheme that updates firmware by downloading a delta file to the mobile terminal through wireless communication. The delta file is a file generated by comparing existing software with new software and extracting delta corresponding to a difference between the two software versions. The mobile terminal updates a previously installed version of the software to an upgraded version, using the delta file. That is, delta file typically contains data and instructions that can be used to convert a currently installed software (equivalently referred to as "file") to an upgraded software.

FIG. 1 is a block diagram illustrating a related art general software update service system for a mobile terminal using FOTA. In this system, a communication provider or manufacturer associated with a mobile terminal 100 uploads a delta file for updating software of the mobile terminal 100 to a FOTA server 102. The FOTA server 102 then transmits a push command (in response to a FOTA command executed by the uploading entity) to a push server 104. The push server 104 transmits a push notification to the mobile terminal 100 in response to the push command. This informs the mobile terminal 100 that a software update is available through a push.

Subsequently, when a user of the mobile terminal 100 requests updating of the software, the mobile terminal 100 downloads the delta file for updating the software from the FOTA server 102. Downloading the delta file from the FOTA server 102 to the mobile terminal 100 is performed based on an OMA-DM protocol. The software updating may be performed when the mobile terminal re-boots, installs the new software version using the delta file, and re-boots again.

Typically, the mobile terminal software is continually upgraded with a new version. There may exist many stepwise versions for a particular software; if so, a delta file is uploaded to a FOTA server for each version. A delta file of each version upgrades a previous version that is one-step lower.

Therefore, the mobile terminal upgrades the software of a currently installed version (the "current version") by receiving only a delta file one-step higher than the current version from among delta files of respective versions provided from a communication provider or a manufacturer.

When a mobile terminal does not perform updating on time, many versions may exist subsequent to the current version. Thus, if versions A, B C, and D exist, a first delta file for upgrading version A to version B is downloaded, then a second delta file for upgrading version B to version C is downloaded, and so on. Also, an installing and re-booting operation is performed for each updating. Therefore, when many versions for updating exist subsequent to the current version, it is burdensome and time consuming to perform the repetitive updating to complete all the updating.

Also, under certain scenarios, an operation of downgrading an upgraded software version to a previous version may be required. For example, downgrading may be required when the mobile terminal user is not satisfied with the upgraded software when compared to the previous version, or when the upgraded software causes a problem in using another software program.

However, as the mobile terminal upgrades the software of the current version by receiving only an incremental delta file for each version, the user only has the choice of upgrading the current software version to version one-step higher, or, declining to upgrade. Therefore, there is no conventional way to downgrade the software to a previous version once upgrading is complete.

Also, a single FOTA server manages and backs up information of all mobile terminals associated with mobile terminal software updating within a large network. Thus, stability is insufficient and a great amount of load may occur when many users concurrently access the single FOTA server.

SUMMARY

Accordingly, an aspect of the present disclosure is to provide a software update service method and apparatus for a mobile terminal, which readily and promptly updates a currently installed software version to a final update version even if intermediate versions exist between the current and final versions.

Another aspect is to provide a software update service method and apparatus for a mobile terminal, which is capable of both upgrading and downgrading software of the mobile terminal.

Another aspect is to provide a software update service method and apparatus for a mobile terminal, which performs updating by freely and selectively upgrading or downgrading software of the mobile terminal to a selected one of plural versions associated with currently installed software in the mobile terminal.

Another aspect is to provide a software update service method and apparatus for a mobile terminal, which improves stability of an FOTA server and decreases its load.

In accordance with an embodiment, a software update service method (and apparatus implementing the method) for a mobile terminal is provided. The method includes requesting an update of a target software of the mobile terminal to a delta generating server. Available update version information indicating a plurality of available update versions for a currently installed version of the target software is received from the delta generating server. The available update version information is displayed, and the delta generating server is notified of a selected version when an update version is selected. A delta file is downloaded from the delta generating server and the target software is updated using the delta file.

In accordance with another embodiment, a software update service method (and apparatus implementing the method) for a mobile terminal in a delta generating server that is connected to an FOTA server is provided. The method includes determining a plurality of available update versions for a currently installed version of a target software responsive to an update request from the mobile terminal, transmitting available update version information indicating available update versions to the mobile terminal, generating a delta file for updating the target software to a selected version when a notice of a selected version is received from the mobile terminal, and downloading the generated delta file to the mobile terminal.

BRIEF DESCRIPTION OF THE DRAWINGS

The above and other aspects, features, and advantages of the present technology will be more apparent from the following detailed description taken in conjunction with the accompanying drawings, in which.

DETAILED DESCRIPTION

Figure 1:
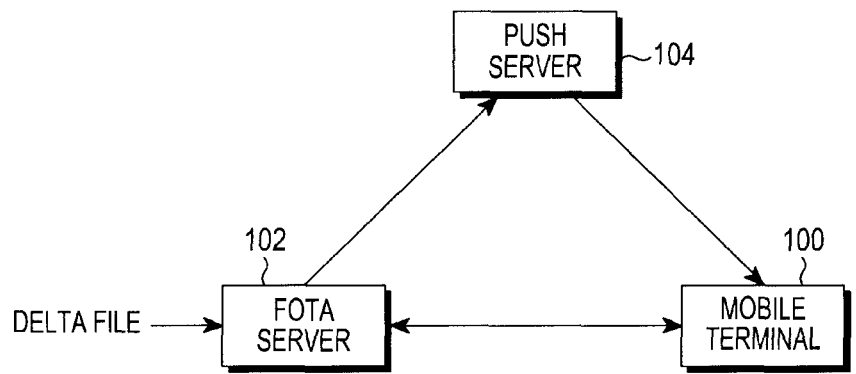
FIG. 1 is a block diagram illustrating a related art general software update service system for a mobile terminal.

Hereinafter, various embodiments of the presently disclosed technology will be described with reference to the accompanying drawings. Further, the following descriptions described using reference numerals in accompanying drawings are provided only to help general understanding of embodiments of the present technology, defined by the idea and technical scope of the present technology determined on the basis of the accompanying claims, and their equivalents. In the drawings, like elements will be designated by like reference numerals.

Although a detailed description to facilitate an understanding of the embodiments is provided, this should be regarded as only exemplary. Therefore, those skilled in the art will appreciate that various modifications and variations are possible, without departing from the scope and spirit of the invention. Also, a detailed description of known functions and configurations incorporated herein will be omitted for clarity and brevity.

Terms and words used throughout the specifications and claims may not be limited to bibliographic meanings, and may be defined by an inventor to help clear and consistent understanding. Therefore, definitions may be construed based on the entire specification.

Embodiments of the present invention may be applicable to other devices having a similar technical field. Also, it will be understood by those skilled in the art that the invention may be applicable to other devices via suitable modification without departing from the scope of the invention.

Figure 2:
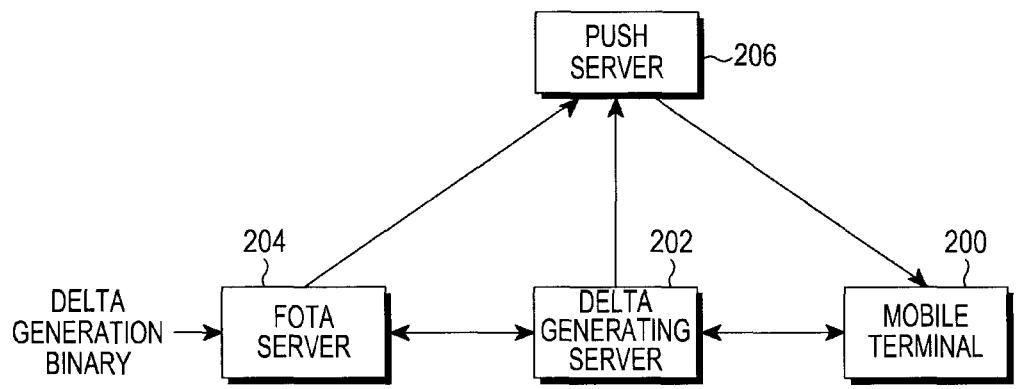
FIG. 2 is a block diagram illustrating a configuration of a software update service system for a mobile terminal according to an embodiment.

FIG. 2 is a block diagram illustrating a configuration of a software update service system for a mobile terminal according to an embodiment. The system includes a delta generating server 202 that is communicatively connected between a mobile terminal 200 and a FOTA server 204. A push server 206 may also be provided.

FOTA server 204 stores software upgrade information, e.g., in the form of delta generation binaries. Delta generation binaries of all software versions (or a subset of all software versions) associated with software of the mobile terminal 200 can be uploaded and stored, e.g., under the control of a communication provider or a manufacturer. Delta files are generated by detecting the differences between an original file and an upgraded file. Unlike a conventional FOTA server that only stores actual delta files, the FOTA server 204 stores delta generation binaries that are used for generating delta files. At least some of the actual delta files may be generated by the delta generating server 202 as described below.

A delta between two software versions is not normally extracted by merely comparing binaries of the two software versions themselves which are targets for delta file generation. This is because upgraded versions of original software typically modify only a minority portion of the original software. Therefore, comparing the entire software code between both versions may require unnecessary processing. In general, a delta may be extracted by comparing delta generation binaries respectively corresponding to the binaries of the two software versions, as opposed to comparing the binaries of the two software versions themselves. As an analogy to explain this concept, suppose an original software version "A" is organized akin to chapters 1-10 in a book, and the original software A was upgraded to version B by modifying only chapter 8. Thereafter, version B is upgraded to version C by modifying only chapter 4. In this example, the delta generation binary for software version B can be thought of as the binary code of only chapter 8, and the delta file "ΔAB" contains the differences between chapter 8 in version A compared to chapter 8 in version B. The delta generation binary for version C would be the new binary code for chapter 4, plus the previously upgraded binary code for chapter 8. The delta file "ΔBC" contains only the differences in chapter 4 from version B to C. However, if the mobile terminal user desires to upgrade from version A to C using a single delta file, a delta file "ΔAC" can be generated by FOTA server 204 by comparing the delta generation binary for version C, i.e., the latest versions of chapters 4 and 8, with the original chapters 4 and 8 in version A. That is, the delta file "ΔAC" contains the differences in both chapters 4 and 8 between versions A and C. If only chapter 10 is modified from version C to D, and the user has version B installed in his mobile terminal which he would like to upgrade to D, a delta file "ΔBD" would be generated by comparing the relevant delta generation binaries of B and D and thereby contain the differences only between chapters 4 and 10, but not chapter 8 since that was modified previously between A and B.

When the communication provider or manufacturer of the mobile terminal 200 uploads a delta generation binary to be used for updating the mobile terminal 200 software to the FOTA server 204, and executes a FOTA command, the FOTA server 204 transmits a push command to push server 206. The push server 206 notifies the mobile terminal 200 of a push in response to the push command and thus, informs the mobile terminal 200 that a software update is available through the push.

A user of the mobile terminal 200 may connect the mobile terminal 200 to the delta generating server 202 so as to determine all available update versions associated with a current version (i.e., the currently installed version) of the mobile terminal 200 software. The user may also select an updated version to which the current version is to be upgraded or downgraded. The delta generating server 202 may generate a delta file from a delta generation binary of the current version and a delta generation binary of the version selected by the user, and downloads the generated delta file to the mobile terminal 200. The generated delta file corresponds to a delta file for updating the current version through upgrading or downgrading based on the current version and the version selected by the user. The delta generation binary of the current version and the delta generation binary of the user selected version are downloaded by the delta generating server 202 from the FOTA server 204 to the delta generating server 202. Downloading a delta generation binary between the FOTA server 204 and the delta generating server 202, and downloading a delta file between the delta generating server 202 and the mobile terminal 200 may be performed based on an OMA-DM protocol.

The delta generating server 202 may be embodied in a personal cloud server of the mobile terminal 200 user. A personal computer, for example, a desktop computer, a laptop computer, and the like, located in a personal space, such as the user's house, may be used as the personal cloud server.

In general, a cloud service refers to a service that allows a user to store a media file such as a movie, a still image, a music file, and the like, and user content such as a document, a contact list, etc. in a server on the Internet, and connects a device such as a mobile terminal, a computer, etc. to the server, enabling user access to the content irrespective of time and place. Similar to the cloud service, the personal cloud server in which the delta generating server 202 is embodied according to some embodiments of the present invention, provides a small-scale cloud service for the user of the mobile terminal 200 within the user's personal space. The delta generating server 202 embodied by the personal cloud server provides a software update service for the mobile terminal 200.

According to another embodiment of the present invention, the delta generating server 202 may be embodied in a public cloud server. Unlike the personal cloud server, the public cloud server refers to a general cloud server that provides a cloud service to a plurality of users. In this embodiment, the public cloud server may be connected between the FOTA server 204 and the mobile terminal 200 as the delta generating server 202, and the mobile terminal 200 may be connected to the public cloud server through the Internet. It should be noted, however, when the public cloud server manages information of a mobile terminal, security for this information may become vulnerable.

The mobile terminal 200 user connects the mobile terminal 200 to the delta generating server 202 to use the software update service through the delta generating server 202, and registers in server 202 information associated with the mobile terminal 200. This information may be registered in server 202 based on unique information of the mobile terminal 200 such as an international Mobile Station Equipment Identity (IMEI). The registered information may further include a model name of the mobile terminal 200, a phone number of the mobile terminal 200 user, software version information of the mobile terminal 200, a customer code of a mobile communication provider to which the mobile terminal 200 subscribes, and the like.

Figure 3:
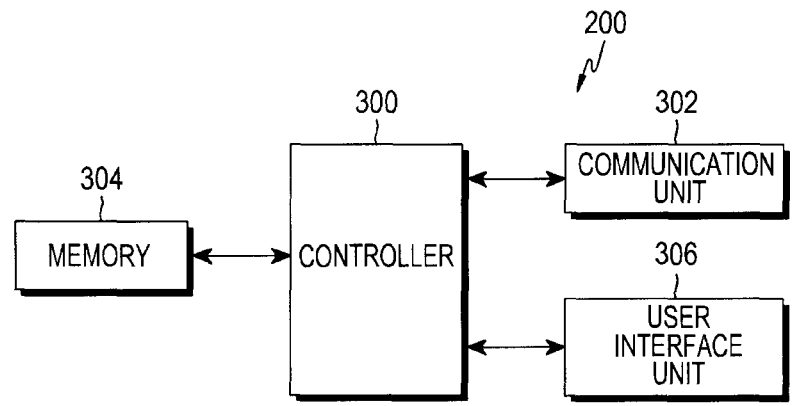
FIG. 3 is a block diagram illustrating a mobile terminal according to an embodiment.

FIG. 3 is a functional block diagram of the mobile terminal 200 according to an embodiment. Mobile terminal 200 includes a controller 300, a communication unit 302, a memory 304, and a user interface unit 306.

The communication unit 302 provides communication between the delta generating server 202 and the mobile terminal 200 through a mobile communication network, or short range communication, based on controlling of the controller 300. The short range communication may include a wireless Local Area network (LAN) such as Wireless Fidelity (Wi-Fi), Bluetooth communication, and the like. The memory 304 stores a program for an operation of the controller 300, and stores various data associated with the operation of the controller 300. The memory 304 may further include an external memory and a storage device such as a Hard Disk Drive (HDD).

The user interface unit (the "UI") 306 provides a user interface between the mobile terminal 200 and the user. The UI 306 may include input and output devices such as a microphone, a speaker, a keypad, a button, a display, and the like (not shown). The UI 306 provides the controller 300 with a user input through the input devices, and provides outputs such as audio and video associated with the operation of the controller 300 through the output devices. A touch screen display may be included, which displays various screens associated with the operation of the controller 300 on a touch screen, and provides the controller 300 with user inputs generated by touch on the touch screen.

The controller 300 performs a general function of the mobile terminal 200. Also, the controller 300 provides the user of the mobile terminal 200 with a software update service in response to a user request for updating "update target software" (also referred to herein interchangeably as just "target software") of the mobile terminal 200 through the UI 306.

Figure 4:
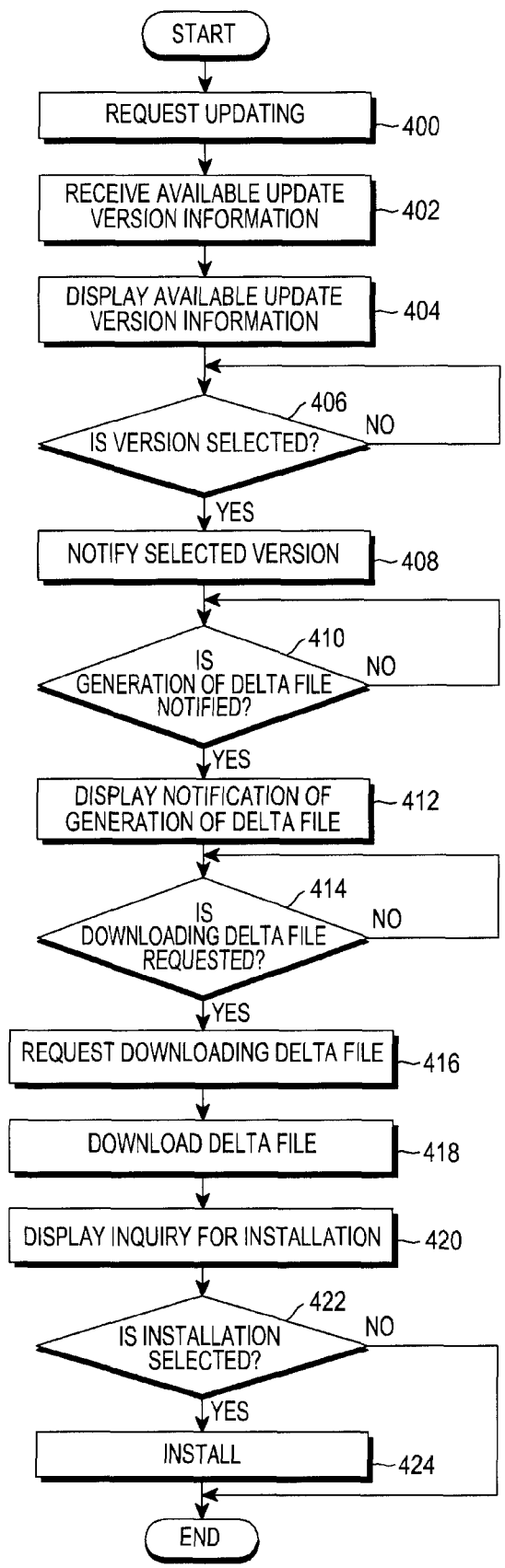
FIG. 4 is a flowchart illustrating a method of updating software in a mobile terminal according to an embodiment.

FIG. 4 is a flowchart illustrating a method of updating software in the mobile terminal 200 according to an embodiment. When a user requests updating "update target software" (e.g., a user selected software program) of the mobile terminal 200 through the UI 306, in step 400 the controller 300 connects to the delta generating server 202 through the communication unit 302. Here, the controller 300 sends a request for updating the update target software to server 202. To this end, the controller 300 transmits information associated with the mobile terminal 200 to server 202 for registration (or to allow confirmation of information already registered in server 202).

Figure 5:
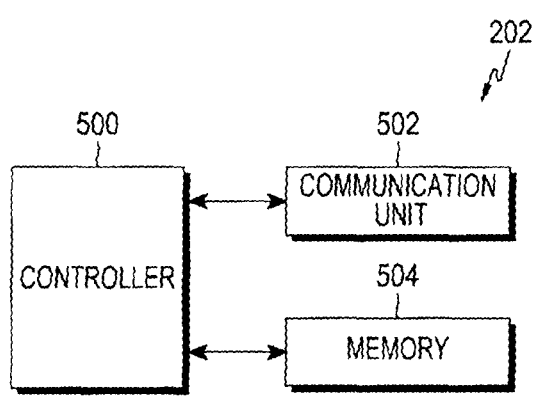
FIG. 5 is a block diagram illustrating a delta generating server according to an embodiment.

Referring temporarily to FIG. 5, a simplified block diagram of an exemplary delta generating server 202 is shown Server 202 includes a controller 500, a communication unit 502, and a memory 504.

The communication unit 502 selectively communicates with the FOTA server 204 and the mobile terminal 200 under the control of controller 500. The memory 504 stores a program for an operation of controller 500, as well as various data for the operation of server 202. The memory 504 may further include an external memory and a storage device such as an HDD.

When controller 500 receives a request from mobile terminal 200 for updating update target software thereof, it provides the mobile terminal 200 with a software update service.

Figure 6:
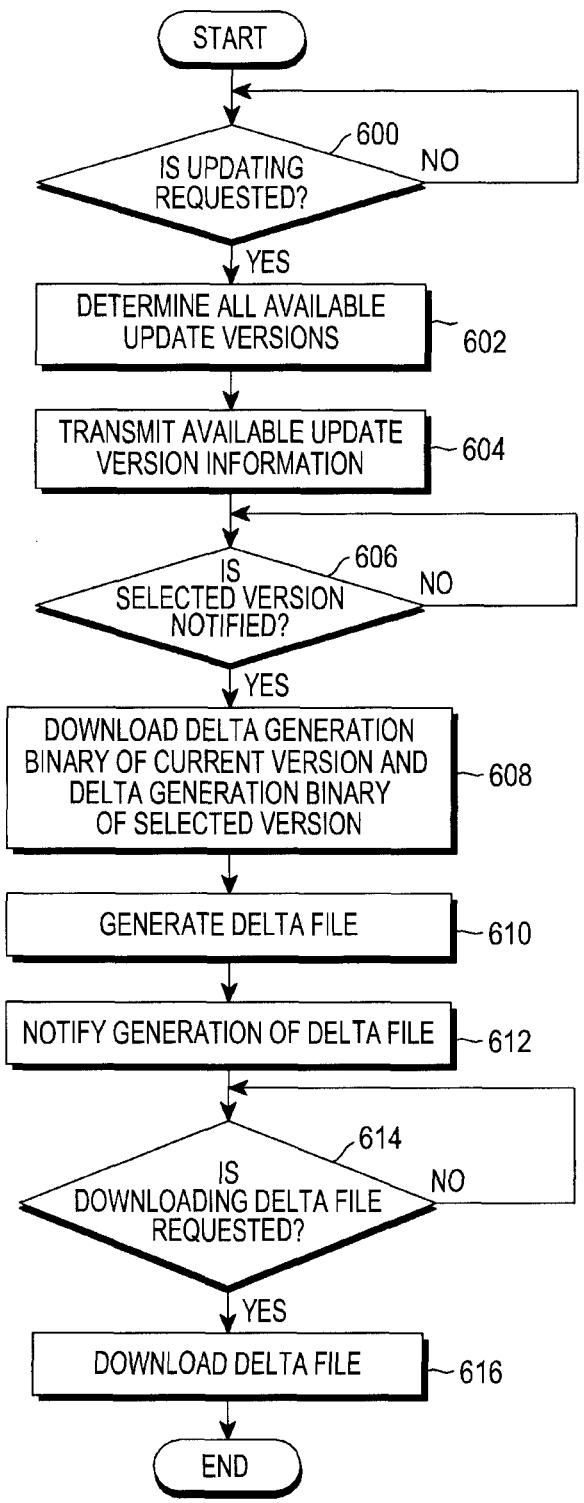
FIG. 6 is a flowchart illustrating a method operative in a delta generating server according to an embodiment.

Referring temporarily to FIG. 6, a flowchart illustrating a method operative in the delta generating server 202 according to an embodiment is shown. When the controller 500 receives the request for updating the mobile terminal 200's update target software it determines at 602 all available update versions for the "current version" of the software (i.e., the version currently installed by the mobile terminal). The available update versions include all versions in steps lower than the current version, i.e., "downgrades", and all versions in steps higher than the current version, i.e., "upgrades". The available update versions can be determined and obtained from the FOTA server 204 through a request sent via the communication unit 502. Alternatively, delta generating server 202 receives version information associated with all versions for the update target software from the FOTA server 204 based on a push, a pull, or polling between the server 202 and the FOTA server 204, and stores the received version information in the memory 504. With this approach, when server 202 receives the software update request from the mobile terminal, it may immediately retrieve the information from memory 504, and a special request for the version information need not be sent to FOTA server 204.

In step 604, the controller 500 transmits available update version information indicating all the determined available update versions to the mobile terminal 200. Subsequently, the controller 500 awaits a notice of a version selected by a user from among all available update versions from the mobile terminal 200 in step 606.

With continued reference to FIG. 4, the controller 300 of the mobile terminal 200 receives the available update version information transmitted from the delta generating server 202 through the communication unit 302 in step 402. Subsequently, the controller 300 displays the received available update version information through the UI 306 in step 404, and waits for the user to select one of the available update versions in step 406. For example, when versions A, B C, and D of which the order of upgrading stage associated with the software of the mobile terminal 200 corresponds to version A→version B→version C→version D exist and the current version corresponds to C, version information indicating an available upgrade version D and available downgrade versions A and B is displayed. Accordingly, the user may identify all available update versions for the current version, and may select a version for upgrading or downgrading. When one of the available update versions is selected by the user through the UI 306, at step 408, the version selection is transmitted to server 202.

Referring again to FIG. 6, when the server 202 receives the user selected version in step 606, the controller 500 downloads, from the FOTA server 204, a delta generation binary of the current version and a delta generation binary of the user selected version in step 608. According to another embodiment of the present invention, the controller 500 downloads in advance, from the FOTA server 204, delta generation binaries of all versions for the update target software based on a push, a pull, or a polling between the delta generating server 202 and the FOTA server 204, and stores the downloaded binaries in the memory 504. In this embodiment, the delta generation binary of the current version and the delta generation binary of the version selected by the user are stored in the memory 504 and thus, step 608 may be omitted.

The controller 500 generates a delta file from the delta generation binary of the current version and the delta generation binary of the user selected version in step 610. The generated delta file corresponds to a delta file for updating the current version to the user selected version through upgrading or downgrading based on the current version and the selected version. When generation of the delta file is completed, server 202 may notify the mobile terminal 200 of the same in step 612. Subsequently, when server 202 receives a request for downloading the delta file from the mobile terminal 200 in step 614, the delta file is downloaded to the mobile terminal 200 in step 616.

The delta generating server 202 may directly notify the mobile terminal 200 of the generation completion of the delta file through a connection to the mobile terminal 200, or may transmit a push command to the push server 206 so as to transmit a push notification indicating the generation completion to the mobile terminal 200. When a time expended for generating the delta file is long, for example, dozens of minutes, there is no need to maintain a connection between the delta generating server 202 and the mobile terminal 200 while the delta file is generated. Therefore, in this case, it is desirable that the generation completion of the delta file is notified through a push notification. The time expended for generating the delta file may vary based on a size of the delta generation binary of the current version and the delta generation binary of the user selected version, and the performance of the delta generating server 202. Therefore, when embodiments of the present invention are implemented in practice, a scheme of notifying the generation completion of a delta file may be determined in consideration of these facts. (Note also that the delta file may have already been generated and may be immediately available if pre-stored in the server 202's memory 504 as described above. In this scenario, an immediate download of the delta file to the mobile terminal 200 may be initiated.)

With continued reference to FIG. 4, when the mobile terminal 200 is notified of the generation of the delta file from server 202 in step 410, a notification is displayed of the generation of the delta file through the UI 306 in step 412 to notify the user of the same. When the user requests downloading the delta file through the UI 306 in step 414, a download request for the delta file is transmitted to server 202 in step 416, and the delta file is thereafter downloaded from server 202 through the communication unit 302 in step 418.

The delta file downloaded to the mobile terminal 200 is used for updating, at once, the current software version to the user selected version from among the available update versions. As discussed earlier, in conventional systems, mobile terminals can only receive a delta file representing an upgrade that is one-step higher than the currently installed version. However, when a delta file according to an embodiment of the present invention is used, the current version may be upgraded by one or several steps, or downgraded to a version desired by the user from among available update versions through a single installation and re-booting operation. Therefore, when many versions for updating exist subsequent to the current software version installed in mobile terminal 200, the current version may be readily and promptly updated to a final update version.

Further, the delta file between the current version and the user selected version is generated by the delta generating server 202 and thus, the software of the mobile terminal 200 may be upgraded or downgraded. Therefore, the user may perform updating by freely and selectively upgrading or downgrading the current version to a desired version from among all versions associated with the mobile terminal 200 software.

Moreover, information associated with the mobile terminal 200 is managed by the delta generating server 202 in which the mobile terminal is registered, rather than by the FOTA server 204. The mobile terminal 200 may perform updating by merely connecting to delta generating server 202, as opposed to directly connecting to the FOTA server 204. Accordingly, with less interactions with individual mobile terminals, stability of the FOTA server 204 may be improved and its load may be decreased.

When downloading of the delta file is completed in step 418, the controller 300 displays inquiry prompt for installation through the UI 306 in step 420, and waits for selection of installation in step 422. When installation is selected and performed at 424 the current version is updated to the user selected version and the process ends. If the user fails to select installation at 422, the process ends.

A mobile terminal according to embodiments of the present invention may execute a program (for example, an application) by installing or downloading the program to provide the software update service, from a program providing device (for example, a server) placed in a remote location, and may use the program for providing the software update service. That is, when the program to be used for providing the software update service is installed in the mobile terminal, the program may be executed in the mobile terminal, and may provide the software update service. The program providing device may transmit the program to the mobile terminal in response to a request for transmitting the program from the mobile terminal, or may transmit the program to the mobile terminal automatically. The program providing device may additionally perform determining of whether the mobile terminal is a subscriber of the service, user authentication, confirmation of payment, and the like. The program providing device may include a communication unit to perform wired or wireless communication with the mobile terminal, a storage medium to store the program, and a controller to transmit the program to the mobile terminal through the communication unit. Also, the storage medium may be included in the program providing device or may exist outside the program providing device.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the technology described herein has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A software update service method for a mobile terminal, the method comprising:
   requesting an update of a target software of the mobile terminal to a delta generating server that is communicatively connected between the mobile terminal and a Firmware Over-The-Air (FOTA) server;
   receiving available update version information indicating a plurality of available update versions for a currently installed version of the target software from the delta generating server;
   displaying the available update version information;
   notifying the delta generating server of a selected version when one of the available update versions is selected; and
   downloading a delta file and updating the target software to the selected version from the delta generating server using the delta file,
   wherein the available update versions include downgrade version and upgrade version, and the delta file is generated from a delta generation binary of the currently installed version and a delta generation binary of the selected version which are downloaded from the FOTA server by the delta generating server,
   wherein the delta file downloaded to the mobile terminal updates, at once, the currently installed version to the selected version from the available update version,
   wherein the update corresponds to one of upgrading and downgrading the target software, and wherein the delta generating server is in a personal cloud server which provides a small-scale cloud service for a user of the mobile terminal within the user's personal space.

2. The method of claim 1, wherein downloading further comprises:
   receiving notice of generation of the delta file from the delta generating server; and
   requesting downloading the delta file to the delta generating server.

3. A software update service method for a mobile terminal in a delta generating server communicatively connected between the mobile terminal and a Firmware Over-The-Air (FOTA) server, the method comprising:
   determining a plurality of available update versions for a currently installed version of a target software responsive to an update request from the mobile terminal;
   transmitting available update version information indicating the available update versions to the mobile terminal;
   generating a delta file for updating the target software to a selected version when a notice of a selected version is received from the mobile terminal; and
   downloading the generated delta file to the mobile terminal,
   wherein the available update versions include downgrade version and upgrade version, and the delta file is generated from a delta generation binary of the currently installed version and a delta generation binary of the selected version which are downloaded from the FOTA server,
   wherein the delta file downloaded to the mobile terminal updates, at once, the currently installed version to the selected version from the available update version,
   wherein the update corresponds to one of upgrading and downgrading the target software, and wherein the delta generating server is in a personal cloud server which provides a small-scale cloud service for a user of the mobile terminal within the user's personal space.

4. The method of claim 3, wherein downloading further comprises:
notifying the mobile terminal of generation of the delta file; and
receiving a request for downloading the delta file from the mobile terminal.

5. The method of claim 3, wherein generating comprises:
generating the delta file from a delta generation binary of the currently installed version and a delta generation binary of the selected version from among delta generation binaries that are downloaded with respect to all versions from the FOTA server in advance and stored.

6. A software update service apparatus for a mobile terminal, the apparatus comprising:
a communication unit to perform communication with a delta generating server that is communicatively connected between the mobile terminal and a Firmware Over-The-Air (FOTA) server;
a user interface unit including a display; and
a processor operatively coupled to the communication unit and the user interface unit;
a non-transitory medium storing a plurality of instructions that when executed by the processor cause a plurality of operations, wherein the plurality of operations comprises:
receiving available update version information indicating a plurality of available update versions for a currently installed version of a target software from the delta generating server,
displaying the available update version information, and downloading, from the delta generating server, a delta file and updating the target software using the delta file to a version selected through the user interface unit,
wherein the available update versions include downgrade version and upgrade version, and the delta file is generated from a delta generation binary of the currently installed version and a delta generation binary of the selected version which are downloaded from the FOTA server by the delta generating server,
wherein the delta file downloaded to the mobile terminal updates, at once, the currently installed version to the selected version from the available update version,
wherein the update corresponds to one of upgrading and downgrading the target software, and wherein the delta generating server is in a personal cloud server which provides a small-scale cloud service for a user of the mobile terminal within the user's personal space.

7. The apparatus of claim 6, wherein the processor is configured to request downloading of the delta file to the delta generating server, when a notice of generation of a delta file is received from the delta generating server.

8. A software update service apparatus for a mobile terminal in a delta generating server communicatively connected between the mobile terminal and a Firmware Over-The-Air (FOTA) server, the apparatus comprising:
a communication unit to perform communication with the FOTA server, and with the mobile terminal;
a processor operatively coupled to the communication unit; and
a non-transitory medium storing a plurality of instructions that when executed by the processor cause a plurality of operations, wherein the plurality of operations comprises:
determining a plurality of available update versions for a currently installed version of a target software of the mobile terminal and transmitting available update version information indicating available update versions to the mobile terminal,
generating a delta file for updating the update target software to a version of which selection from among all available update versions is notified from the mobile terminal, and downloading the delta file to the mobile terminal,
wherein the available update versions include downgrade version and upgrade version, and the delta file is generated from a delta generation binary of the currently installed version and a delta generation binary of the selected version which are downloaded from the FOTA server,
wherein the delta file downloaded to the mobile terminal updates, at once, the currently installed version to the selected version from the available update version,
wherein the update corresponds to one of upgrading and downgrading the target software, and wherein the delta generating server is in a personal cloud server which provides a small-scale cloud service for a user of the mobile terminal within the user's personal space.

9. The apparatus of claim 8, wherein the processor is configured to notify the mobile terminal of the generation of the delta file, and receive a request for downloading the delta file from the mobile terminal.

10. The apparatus of claim 8, wherein the processor is configured to generate the delta file from a delta generation binary of the currently installed version and a delta generation binary of the selected version from among delta generation binaries that are downloaded with respect to all the versions from the FOTA server in advance and stored.

* * * * *